Feb. 13, 1951

F. KESSLER 2,541,589

ARRANGEMENT FOR DISCONNECTING SWITCHING EQUIPMENT FROM TELEPHONE LINES

Filed Oct. 7, 1947

3 Sheets-Sheet 1

INVENTOR.
FRANK KESSLER
BY Chas. W. Candy
ATTORNEY

Feb. 13, 1951 F. KESSLER 2,541,589

ARRANGEMENT FOR DISCONNECTING SWITCHING EQUIPMENT FROM TELEPHONE LINES

Filed Oct. 7, 1947 3 Sheets-Sheet 2

*INVENTOR.*
FRANK KESSLER
*BY* Chas. W. Candy
ATTORNEY

INVENTOR.
FRANK KESSLER
BY
Chas. W. Candy
ATTORNEY

Patented Feb. 13, 1951

2,541,589

UNITED STATES PATENT OFFICE 2,541,589

ARRANGEMENT FOR DISCONNECTING SWITCHING EQUIPMENT FROM TELEPHONE LINES

Frank Kessler, Rochester, N. Y., assignor to Automatic Electric Laboratories, Inc., Chicago, Ill., a corporation of Delaware Application October 7, 1947, Serial No. 778,486

10 Claims. (Cl. 179—175)

The present invention relates in general to improvements in telephone systems and more particularly to improved arrangements for testing telephone lines.

In order to facilitate the testing of the various lines which enter a telephone exchange it is usual to provide in the exchange a centralized test desk and automatic switching apparatus by means of which it is possible to extend a test circuit from the test desk directly to the conductors of any desired one of the lines. Facilities of this character ordinarily include some arrangement for clearing a line of attachments, i. e., for disconnecting from the line under test that part of the exchange equipment which is normally connected to the line conductors of such line and which, if permitted to remain connected thereto, would adversely affect the test.

While the arrangements which heretofore have been provided for clearing a line of attachments are quite satisfactory under most conditions encountered in practice they usually are totally ineffective in the presence of certain abnormal conditions. If, for example, a connection is extended from the test desk to a line at a time when a "permanent" condition exists upon that line due to its conductors accidentally having become bridged and/or grounded, the conventional arrangements will not disconnect the exchange equipment attached to the line conductors, and accordingly it is not possible to perform a satisfactory test upon the line over the connection extended thereto from the test desk.

The present invention is an improvement on the invention described in Patent No. 2,371,989 issued March 20, 1945, to Morris E. Griffins et al., and it is the general object of the present invention, therefore, to provide an improved arrangement for clearing a line of attachments, not only under normal conditions, but under the abnormal conditions noted.

The accidental bridging and/or grounding of a line simulates a calling condition and may be of such nature that it operates the line equipment and results in the extension of a connection from the line to switching equipment which is common to a group of lines. The faulty condition may be of such nature that it will not operate the line equipment but it will hold equipment common to a group of lines in case an attempt is made to extend a call to or from the faulty line. It is another object of the present invention to provide an improved arrangement for breaking down a connection thus extended or held.

It may be noted in Griffins 2,371,989 that a separate battery is used for releasing the line relay of held switching equipment, and that the release of the line relay is effected by energizing its windings differentially. This separate battery is connected to the test conductors through contacts of a key at the test desk and remains connected to the test conductors as long as the connecting key is operated. The amount of current flow from the separate battery that can flow over the test conductors in case a very low resistance fault is encountered is limited by fixed resistors through which the battery connections are taken.

It is another object of the present invention to use the same battery from which the switching equipment is operated for clearing a subscriber line of attachments under the abnormal conditions noted.

It is another object of the present invention to provide for connecting the exchange battery to the test conductors at a point intermediate of the test desk and the switching equipment which is to be released.

It is a further object of the present invention to provide for automatically disconnecting exchange battery from the test conductors immediately after the held switching equipment is released.

It is a still further object of the present invention to provide means for limiting the current flow from exchange battery connected to the test conductors to a predetermined amount and if such limit is reached to reduce the current flow to a relatively low value.

According to one feature of the invention the arrangement is suitable for clearing a permanent line of attachments even though the test desk is located at a remote point from the switching equipment.

According to another feature of the invention a relay, operated only in case a busy condition is encountered on the line to which a connection is extended, controls the connection of exchange battery to the test conductors.

According to another feature of the invention a change over relay used to control circuits to the vertical and rotary magnets of a switch is also used for guarding a line from which switching equipment has been disconnected.

According to a further feature of the invention a conductor used for impulsing control is also used to control the connection of exchange battery to the test conductors.

According to another feature of the invention a conductor used for supervisory control is also used to control the connection of exchange battery to the test conductors.

The foregoing objects and features of the invention will be understood better and other objects and features of the invention will be apparent from the following detailed description, taken in conjunction with the accompanying drawing, comprising Figures 1 to 3 inclusive which forms a part thereof, showing the invention as applied to the well known Strowger step by step system. It will be understood, however, that this arrangement is described by way of example only, that various modifications may be made in the circuit details by those skilled in the art without departing from the spirit of the invention, and that the invention can be applied to other systems.

Referring now to the drawing comprising Figures 1 to 3 inclusive Figure 1 shows diagrammatically part of the common equipment at a test desk and equipment for connecting it to an individual test distributor.

Figure 1:
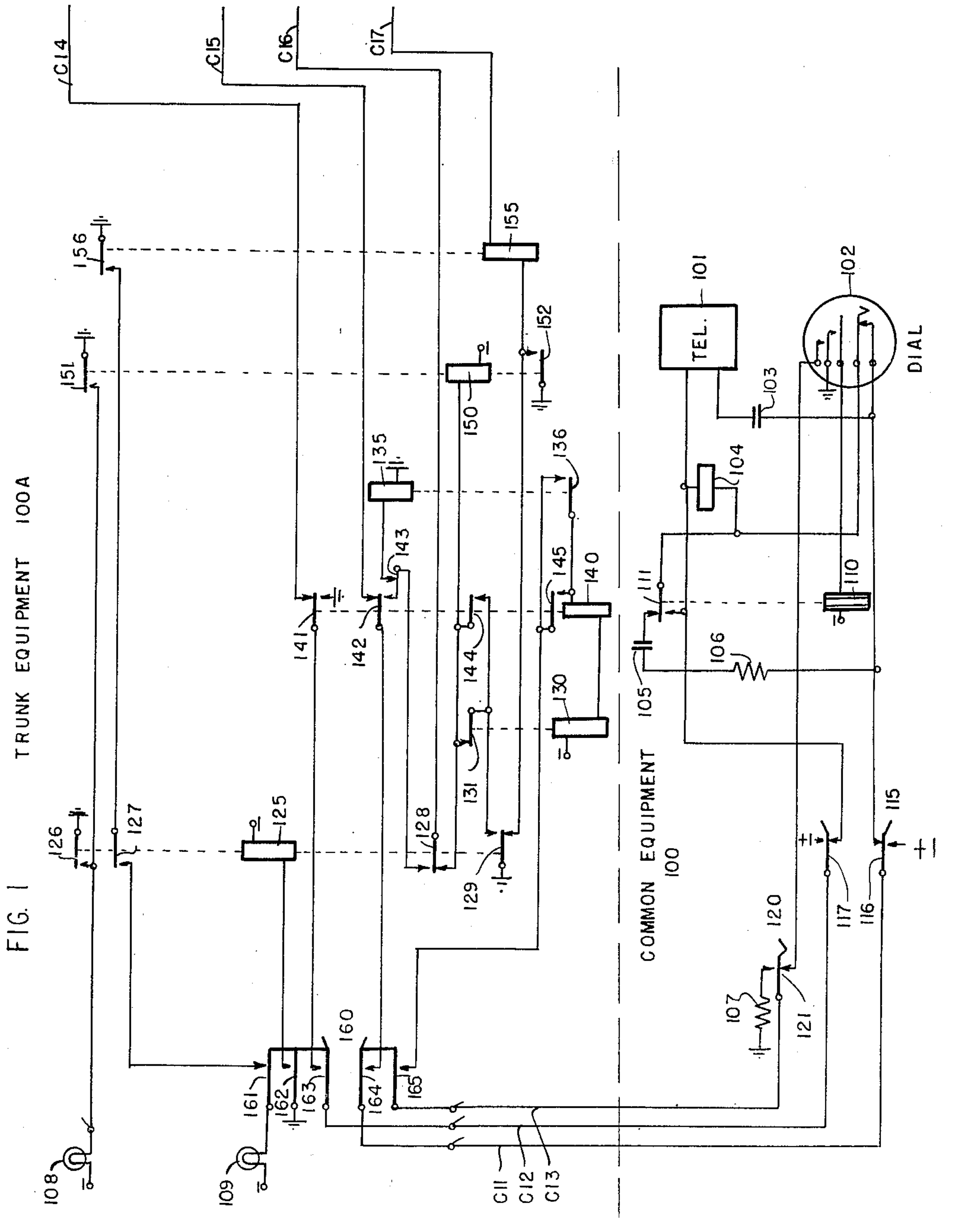
Figure 2:
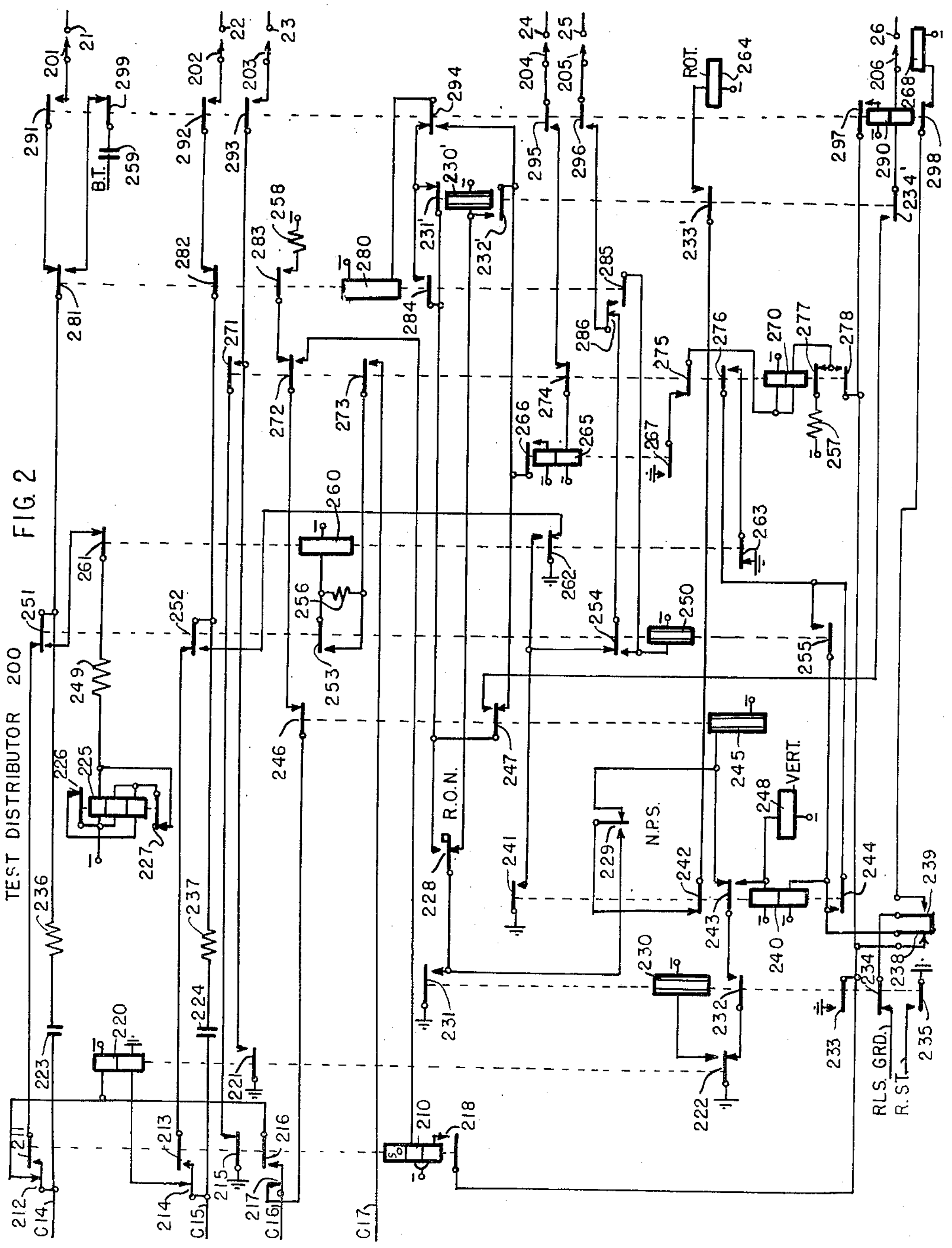
Figure 2 shows the circuit of a test distributor for use with the equipment in Figure 1.
Figure 3:
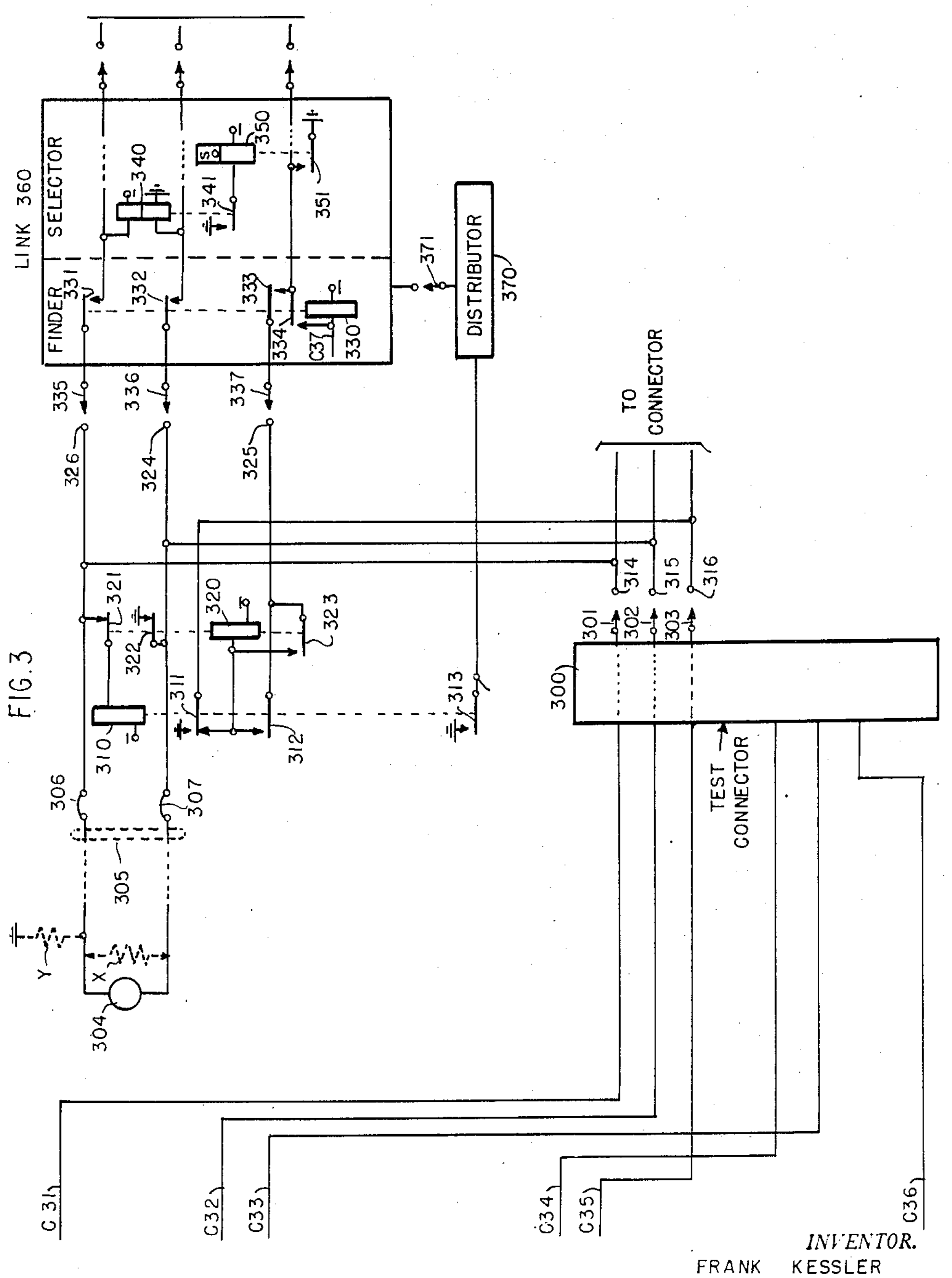
Figure 3 shows a test connector for operation with the test distributor in Figure 2, a line and a circuit therefore, and a finder-selector link for use in extending connections from the line.

The drawing is to be assembled with Figure 1 on the left, Figure 2 in the center and Figure 3 on the right.

The common equipment 100 shown in the lower portion of Figure 1 is arranged for connection to various trunk equipments on the test desk over the conductors C11, C12 and C13. The trunk equipment 100A shown in the upper portion of Figure 1 is individual to the test distributor shown in Figure 2 and is connected thereto over the conductors C14 to C17 inclusive and is connected to the common equipment by the operation of the key 160. The equipment shown in Figure 1 may be part of any conventional telephone type test desk but is preferably of the type described in the co-pending application of Frank Kessler, Serial No. 774,495, filed September 17, 1947.

The test distributor 200 shown in Figure 2 is a conventional two motion Stowger type switch arranged for connection to test connectors, such as test connector 300, by means of the wipers 201 to 206 inclusive. The test distributor is somewhat similar to the test distributor described in the co-pending application of Frank Kessler Serial No. 774,495, filed September 17, 1947, differing mainly in the arrangement for releasing switching equipment associated with a faulty line. It may be noted that with relays 250 and 290 operated and with relays 260 and 280 normal negative battery is connected through armature 226, lower winding of the relay 225, armature 227, resistor 249, and armatures 261, 251, 281 and 291 to the wiper 201 and that direct ground is connected through armatures 262, 252, 282 and 292 to the wiper 202. This arrangement permits conductors to which the wipers 201 and 202 are extended to be effectively short circuited as will be fully described hereinafter.

The test connector 300 in Figure 3 is one of a number of test connectors which terminate in the banks of the test distributor 200, and is similar to the test connector described in the abovementioned copending Kessler application which may be seen for a detailed description thereof.

The line 305 in Figure 3 is connected through the protecting equipment 306 and 307 to a line circuit comprising the line relay 310 and the cutoff relay 320. The conductors of the line 305 terminate in contacts 314, 315 and 316 in the bank of test connector 300 and are multipled to similar contacts in the regular subscriber controlled connectors (not shown) by means of which calls are extended to the various lines. The substation 304 associated with the line 305 may be any standard type equipped with the usual talking and signalling instrumentalities and with a calling device suitable for operating automatic switching equipment. The switching equipment includes links such as 360 which comprises a finder switch having access to calling lines and a selector switch having access to called lines over a train of one or more subsequent switches, depending on the number of lines in the system. Reference may be had to Patent No. 2,214,908, issued September 17, 1940, to C. E. Lomax et al., for additional details of one suitable form of finder-selector link.

The general procedure involved in making tests upon various lines is fully set forth in the copending Kessler application, Serial No. 774,495, filed September 17, 1947. The procedure for connecting the test desk through distributor 200 to the line 305 will now be described in detail.

The operation of the key 160 prepares a circuit to the lamp 109 at spring 161, closes an obvious circuit to the relay 125 at spring 162, connects conductor C12 to conductor C14 at spring 163, connects conductor C11 to conductor C15 at spring 164, and connects conductors C13 to armatures 145 and 136 at spring 165. The relay 125 operates and at armature 126 lights the lamp 108, prepares a circuit to the lamp 109 at armature 127, connects battery through the winding of the relay 135, contacts 143 and armature 128 to conductor C16, and closes a circuit from ground through armatures 129 and 131 and the winding of the relay 150 to battery. The relay 150 operates, at armature 151 closing another circuit to the lamp 108 and at armature 152 connecting ground through the winding of the relay 155 to conductor C17. The relay 220 is energized from battery through its upper winding, contacts 212, conductor C14, armature 141, spring 163, conductor C12, spring 117, inductance 104, lower contacts, the impulsing contacts, of the dial 102, spring 116, conductor C11, spring 164, armature 142, conductor C15 contacts 214, and lower winding of the relay 220 to ground. The relay 220 operates connecting ground through armature 221 to armature 293 and closing a circuit from ground at armature 222 to the relay 230. The relay 230 operates, at armature 231 closes a circuit from ground through spring 228 and the winding of the relay 230′ to battery, at armature 232 prepares the impulsing circuits to the stepping magnets and associated control relays, at armature 233 connects ground through off normal spring 238 and the lower winding of the relay 240 to battery, at armature 234 disconnects RLS. GRD. from off normal spring 239, and at armature 235 grounds the RM. ST. lead to control associated common equipment. The relay 230′ operates, at armature 231′ opens an incomplete circuit for the relay 280, at armature 232′ prepares a holding circuit for itself, at armature 233′ prepares a circuit for the rotary magnet, ROT., and at armature 234′ prepares a circuit for the lower winding of the relay 290. The relay 240 operates, at armature 242 opens the incomplete circuit to the rotary magnet ROT., at armature 243 prepares a circuit to its upper winding and the vertical magnet VERT. in multiple, and closes its other armature the functions of which will be described subsequently.

The test distributor 200 may now be connected to the test connector 300 under control of the dial 102. When the dial 102 is moved off normal the three upper contacts are closed and relay 110 is operated from ground. Relay 110 short circuits the inductance 104 to improve impulsing. Ground is connected through the upper contact of the dial through spring 121, conductor C13, and spring 165 to armatures 145 and 136 for a purpose which will subsequently be described. As the dial 102 restores to normal the relay 220 follows the impulses generated at the two lower contacts of the dial 102 and at armature 222 alternately closes and opens a circuit to the vertical magnet VERT. and the upper winding of the relay 240. The vertical magnet VERT. moves the wipers 201 to 206 inclusive to the level in which the contacts 21 to 26 inclusive are located. The circuit to the relay 230 is interrupted during impulsing but the relay 230 is slow to release and does not restore at this time. On the first operation of the vertical magnet VERT. the off normal spring 238 is opened thus opening the circuit to the lower winding of the relay 240. The relay 240 is slow to release and is held operated by its upper winding energized in multiple with the vertical magnet VERT. After the dial 102 restores to normal the relay 220 remains operated and the relay 240 releases, preparing a circuit at armatures 242 and 243 for the rotary magnet ROT. The relay 220 follows the impulses of the next digit alternately closing and opening a circuit to the rotary magnet ROT. from ground through armatures 222, 232 and 243, spring 229, and armatures 242 and 233', and closing a circuit to the relays 245 from ground through armatures 222, 232 and 243. The rotary magnet ROT. moves the wipers 201 to 206 inclusive into contact with the contacts 21 to 26 inclusive, and on its first operation operates the spring 228 thus opening the starting circuit to the relay 330' and preparing a circuit to the relay 280. The relay 245 operates on the first closure of the armature 222 and remains operated, because of its slow release feature, while the impulses of one digit are being received. The relay 245 on operating opens the incomplete circuit to the lower winding of the relay 290 at armature 247 and closes a holding circuit for the relay 330 from ground through armature 231, operated spring 228, armature 247 and armature 232'. After the dial 102 restores to normal the relay 220 remains operated and the relay 245 restores, opening a circuit to the relay 230' and preparing a circuit to the lower winding of the relay 290 at armature 247. The relay 230' is slow to release and will not restore until shortly after the relay 245 restores.

If the test connector 300 is idle battery through contact 26, wiper 206, lower winding of relay 290, armatures 234' and 247, operated spring 228 and armature 231 to ground energizes the lower winding of the relay 290 operating the armature 297, which closes a circuit from battery through the upper winding of the relay 290 to ground at armature 233. The relay 290 operates in full when its upper winding is energized and at armatures 291, 292, 293, 295 and 296 connects up the wipers 201 to 205 respectively, at armature 299 disconnects the B. T. lead, at armature 294 prepares a circuit for the relay 280, and at armature 298 disconnects the release magnet 268. The relay 330' restores, opens its holding circuit at armature 323', opens a circuit to the rotary magnet ROT. at armature 233' and opens the circuit to the lower winding of the relay 290 at armature 234'.

If the test connector 300 is busy battery is not encountered on the contact 26 and the relay 290 does not operate. When the relays 245 and 230' restore the relay 280 operates from battery through its winding, armatures 294 and 231', spring 228 and armature 231 to ground. The relay 280 connects tone from the B. T. lead through condenser 259, armatures 299, and 281, resistor 236, condenser 233 and conductor C14 to the telephone 101 to signal the test desk, connects battery through resistor 258, armatures 283, 272 and 246, contacts 217, conductor C16, armature 128, contacts 143 and the winding of the relay 135 to ground, and closes a holding circuit to itself at armature 284.

Assume now that connection with the test connector 300 was established when the test connector was idle and that the relay 290 is operated. The relay 220 responds to the impulses of the next digit closing and opening a circuit to the relay 245 at armature 222 and opening and closing ground on conductor C33 at armature 221. The ground pulses from armature 221 transmitted to the test connector 300 through armature 293, wiper 203, contact 23 and conductor C33 serve to operate the vertical magnet of the test connector and lift the wipers 301, 302 and 303 to the level corresponding to the dialed digit. The relay 245 operates on the first impulse and remains operated while the remaining impulses of the digit are received. The relay 280 is operated from battery through its winding, armatures 294 and 247, spring 228 and armature 231 to ground, but has no function to perform at this time. When the dial restores to normal the relay 220 remains operated and the relay 245 restores opening the circuit to the relay 280 at armature 247, thus allowing the relay 280 to restore. The relay 220 responds to the impulses of the next digit, the opening and closing of ground at armature 221 serving to operate the rotary magnet of the test connector 300 and move wipers 301, 302 and 303 to the contacts corresponding to the dialed digit. The relays 245 and 280 are operated as before, the relay 280 connecting battery through the winding of the relay 250, armatures 285 and 296, wiper 205, contact 25, conductor C35 through the test connector 300 to the wiper 303, and opening circuits from the conductors C14 and C15 to the wipers 201 and 202 at armatures 281 and 282.

At the first closure of the rotary magnet circuit in the test connector 300 ground is connected over conductor C34, contact 24, wiper 204, armatures 295 and 274, through the lower winding of the relay 265 to battery. The relay 265 operates and locks itself in multiple with the relay 280 through armature 266 and at armature 267 differentially energizes the two windings of the relay 270. The relay 270 operates only the armature 278 when thus energized. After the dial restores to normal the relay 220 remains operated and the relay 245 restores, opening circuits to the relays 265 and 280 at armature 247. The relay 265 restores and disconnects ground from the upper winding of the relay 270 at armature 267. The two windings of the relay 270 are now energized in series from battery through the upper winding, through the lower winding and through armatures 278 and 233 to ground and the remaining armatures of the relay 270 are operated. Battery through the upper winding of the relay 210 is now connected through armatures 272 and 246, contacts 217, conductor C16, armature 128, contacts 143 and the winding of the relay 135 to ground. Battery through the winding of the relay 260, resistor 256, armature 273, conductor C17, winding of the relay 155 to ground at armature 152 energizes the relays 155 and 260 in series. At armature 274 the lower winding of the relay 265 is disconnected from the wiper 204 to prevent further operation of the relay 265 and at armature 276 a circuit to the lower winding of the relay 240 is prepared for control purposes which will be described hereinafter.

The relay 290 on restoring prepares circuits from conductors C14 and C15 to wipers 201 and 202 at armatures 281 and 282 and at armature 285 opens a circuit from the wiper 205 to the winding of the relay 250. The relay 250 operates in case the test connector 300 is connected to the bank contacts of a busy line, the busy condition being indicated by ground on a bank contact such as the bank contact 316. The relay 250 closes a holding circuit for itself at armature 254 and remains operated as long as the busy condition persists. The functions of the relay 250 will be fully described hereinafter. The relay 260 energized over a previously traced circuit operates and at armature 262 connects ground through armature 254, in case the relay 250 is not operated, contacts 286, armature 296, wiper 205, contact 25, conductor C35, wiper 303, bank contact 316, armature 311 and the winding of the relay 320 to battery. Ground on the contact 316 is extended over multiple connections to similar bank contacts to make the line 305 busy, and the cut-off relay 320 is operated to clear the line 305 of attachments. The relay 210 energized over a previously traced circuit operates armature 218 closing a circuit from battery through the lower winding of the relay 210 and armatures 218 and 233 to ground. The relay 210 operates in full when its lower winding is energized and, at armature 216, connects battery through the wiper winding of the relay 220 over conductor C16 to ground through the winding of the relay 135 to hold the relays 220 and 135 operated, at contacts 217 disconnects the upper winding of the relay 210 from conductor C16, at armature 211 connects conductor C14 through armatures 251, 281 and 291 to wiper 201, at armature 213 connects conductor C15 through armatures 252, 282 and 292 to wiper 202, and at contacts 212 and 214 disconnects the windings of the relay 220 from conductors C14 and C15.

The test desk is now connected directly to the line 305 and any of the regular testing operations may be performed. Should the tester desire to move the wipers of the test connector to the bank contacts of another line the dial 102 is operated energizing the relays 130 and 140 in series from battery through the winding of relay 130, winding of the relay 140, armature 136, spring 165, conductor C13, spring 121 to ground at the upper contacts of the dial 102. The relays 130 and 140 operate, the relay 130 having no function to perform at this time. The relay 140 closes a holding circuit to itself at armature 145, closes a holding circuit to the relay 150 at armature 144, opens a circuit to the relay 135 at contacts 143, and closes an impulsing circuit to the upper winding of the relay 220 which may be traced from battery through the upper winding of the relay 220, armature 216, conductor C16, armatures 128 and 142, spring 164, conductor C11, spring 116, lower contacts of the dial 102, armature 111, spring 117, conductor C12, spring 163, and armature 141 to ground. The relay 220 follows the impulses from the lower contacts of the dial 102 and at armature 221 operates the test connector 300 as previously described. At armature 222 the relay 245 is operated and in turn operates the relay 280 which disconnects the conductors C14 and C15 from the wipers 201 and 202 and connects the relay 250 to the wiper 303 to provide for a busy test of the line to which the test connector 300 is next connected. After the dial restores to normal the relays 130 and 140 restore and the relays 135 and 220 are operated in series over a previously traced circuit. It may be noted that the conductor C13 is used for impulsing control purposes when the test connector is operated as described above.

In case a line is busy ground is encountered on a bank contact such as the bank contact 316. During impulsing the relays 245 and 280 are operated, as previously described, and battery through the winding of the relay 250, armatures 285 and 296, wiper 205, contact 25 and conductor C35 is extended through the test connector 300 to the wiper 303. When ground is encountered on a bank contact, such as the bank contact 316, the relay 250 operates and prepares a holding circuit for itself at armature 254. When the relay 280 restores, after impulsing, the relay 250 is held from ground through wiper 303, contacts 286 and armature 254. The relay 260 energized in series with the resistor 256 and the relay 155 as previously described operates, but the relay 155 will not operate in series with the resistor 256. After impulsing, the relay 245 restores and closes a circuit to the upper winding of the relay 210 which operates as previously described. The direct circuit from conductors C14 and C15 to wipers 201 and 202 is now opened at armatures 251 and 252. However, a circuit suitable for voice current is provided through condensers 223 and 224 and resistors 236 and 237. The resistor 256 is short circuited at armature 253 allowing the relay 155 to operate thus closing a circuit to the lamp 109 at armature 156. The lamp 109 indicates to the tester the busy condition of the line with which connection has been established. If the line to which connection has been established becomes free ground is disconnected from the wiper 303 and the relay 250 restores. The short circuit is removed from the resistor 256 thus causing the relay 155 to restore and extinguish the lamp 109. Ground through armatures 262 and 254 is extended to wiper 303 to make the line busy and the testing circuit is completed at armatures 251 and 252. It may be noted that the busy condition of a line to which a connection is established is extended to the test desk under control of the relay 250 and over the conductor C17.

After the tester has extended a connection over the test switch train to a line in the way described and has received an indication that the line tests busy, if no conversation is heard through the transmission circuit provided through condensers 223 and 224 he may wish to proceed with the usual line tests. The present invention provides an arrangement by means of which the tester can remove the busy condition of the line under test even though the test desk may be located at a relatively great distance from the exchange in which the line under test terminates.

As is well known a permanent may result from the line conductors being accidentally bridged as shown at X, from one of the conductors being accidentally grounded as shown at Y, or from a combination of these two causes. It will be assumed in order to describe the invention the line 305 has become bridged as shown at X and that the resistance of the bridge is low enough to operate either the relay 310 or the relay 340. With the relay 320 normal a circuit may be traced from battery through the winding of the relay 310, armature 321, upper conductor of line 305, bridge X, lower conductor of line 305, and armature 322 to ground. The relay 310 operates, grounding the contact 316 at armature 311 to make the line busy, connecting battery through the winding of the relay 320 and armature 312 to contact 325 to mark the line 305, and connecting ground through armature 313 to the distributor 370 to start a finder switch searching for the marked line.

Assume that the distributor has connected with the finder of the link 360 over a hunter switch 371 and that the finder will move its wipers 335, 336 and 337 until they engage the bank contacts 326, 324 and 325 respectively. Thereupon, as is well known, the movement of the wipers is halted, and switching relay 330 is operated by ground, connected for a brief interval to conductor C37. Relay 330 upon operating completes a circuit from ground on conductor C37, armatures 334 and 333, wiper 337, contact 325, armature 312 and the winding of the relay 320 to battery and completes a circuit from battery through the upper winding of the relay 340, armature 331, wiper 325, contact 326, upper conductor of line 305, bridge X, lower conductor of line 305, contact 324, wiper 336 and the lower winding of the relay 340 to ground. Relay 320 operates, disconnects the winding of the relay 310 from the line 305 at armature 321, disconnects ground from the line 305 at armature 322 and closes a holding circuit to itself at armature 323. The relay 340 operates and closes an obvious circuit to the relay 350 which operates and at armature 351 closes holding circuits to relays 330 and 320. Relay 310 restores and the busy condition of the line 305 is maintained by ground from armatures 351 and 333, wiper 337, contact 325, and armatures 323 and 311 to contact 316.

It should be mentioned that certain known arrangements, for example the one shown in Lomax et al. 2,214,908 depart from the mode of operation just described in that the relay 340 is operated over a pre-energizing circuit (not shown) before the contacts 331 and 332 are closed. When this practice is followed the said pre-energizing circuit is opened after the line 305 has been switched through to relay 340 at contacts 331 and 332, so that relay 340 is held over the line loop as described. The operation of the relay 350 occurs before ground is removed from conductor C37, so that, upon such removal, relays 330 and 320 are held operated from ground at armature 351.

It will be appreciated that the operations described heretofore, which have taken place as a result of line 305 becoming bridged at X, are exactly the same as would have taken place if a call had been originated by removing the receiver at substation 304. The apparatus will remain in the condition described as long as the bridge at X persists or until corrective measures are taken.

Assume now that the link 360 is held by the bridge X on the line 305 at the time the tester extends a connection to the line 305 by means of test distributor 200 and test connector 300. The relay 250 is operated from ground on contact 316 and the relays 155 and 260 are operated in series over the conductor C17. The relays 245 and 280 restore after the impulses of the final digit have been received whereupon the relay 210 operates as previously described and a transmission circuit is completed through condensers 223 and 224. The tester is signalled by the lamp 109 and hearing no conversation decides that the line is held by a fault. In order to release the switching equipment held by the line 305 the tester operates the key 120 connecting ground through resistor 107, spring 121, conductor C13, spring 165, armature 136 and the windings of relays 140 and 130 to battery. Relay 140 does not operate when energized in series with resistor 107. Relay 130, however, operates and opens the circuit to the relay 150 at armature 131. The relay 150 restores and opens the circuit to the relays 155 and 260 at armature 152. The relay 260 restores and a circuit may now be traced from battery through armature 226, lower winding of relay 225, armature 227, resistor 249, armatures 261, 251, 281 and 291, wiper 201, contact 21, conductor C31, wiper 301, contact 314, contact 326, wiper 325 and armature 331 to the upper winding of the relay 340 and another circuit may be traced from ground through armatures 262, 252, 282 and 292, wiper 202, contact 22, conductor C32, wiper 302, contact 315, contact 324, wiper 326 and armature 332 to the lower winding of the relay 340. The resistance of the lower winding of the relay 225 and the resistor 249 is very low and thus effectively the full voltage of the exchange battery is connected to both terminals of the upper winding of the relay 340 and direct ground is connected to both terminals of the lower winding of the relay 340. The relay 340 releases as little if any current can flow through its windings and the circuit to the relay 350 is opened at armature 341. The relay 350 restores and at armature 351 opens the holding circuits to the relays 330 and 320 and disconnects ground from contact 316, opening the circuit to the relay 350. The link 360 releases in well known manner and the windings of the relay 340 are disconnected from the line 305 at armatures 331 and 332 and at wipers 335 and 336. The relay 320 restores and connects the winding of the relay 310 to the line 305 at armature 321. The relay 310 is prevented from operating in series with the bridge X by the negative battery which is still connected through the wiper 301 to the upper conductor of the line 305.

The relay 260 on restoring closed a circuit from ground through armatures 263, 276 and 255 and the lower winding of the relay 240 to battery. The relay 240 operates and, at armature 244, closes a multiple holding circuit to itself, and, at armature 241 prepares a circuit for the cut off relay 320. Shortly after ground has been removed from contact 316 by the restoration of the armature 351 the relay 250 restores. The relay 250 on releasing disconnects battery from the upper conductor of the line 305 at armature 251, disconnects ground from the lower conductor of the line 305 at armature 252, removes the short circuit from the resistor 256 at armature 253 and completes a circuit from ground through armature 241 and 254, contacts 286, armature 296, wiper 205, contact 25, conductor C35, wiper 303, contact 316, armature 311 and the winding of the relay 320 to battery. The relay 320 operates and disconnects the winding of the relay 310 and ground from the line 305 at armatures 321 and 322.

Restoration of the key 120 opens the circuit to the relays 130 and 140. The relay 130 restores closing a circuit to the relay 150 at armature 131. The relay 150 operates and connects ground through armature 152, winding of relay 155, conductor C17, armature 273, resistor 256 and the winding of the relay 260 to battery. The relay 155 does not operate but the relay 260 operates, opening a circuit to the lower winding of the relay 240 at armature 263, and closing a multiple holding circuit to the relay 320 at armature 262. The relay 240 restores shortly after its circuit is opened at armature 263 disconnecting a multiple ground from the relay 320 at armature 241. Conductors C14 and C15 are now connected to the line 305 through armatures 251 and 252 and the usual line tests may now be made.

It may be noted that the conductor C13 is used to control impulsing under certain conditions and is also used to effect the connection of battery and ground to the wipers 201 and 202 and thus to a line with which the test connector 200 has been connected, and that the conductor C17 is used to control the relay 155 thus operating the lamp 109 for supervisory purposes and that is also used to control the relay 260 and thus effect the connection of battery and ground to the wipers 201 and 202. It may also be noted that the relay 250 controls the lamp 107 by means of the relay 155 and the resistor 256 and also controls the connection of battery and ground to the wipers 201 and 202, that the relay 250 will disconnect battery and ground from the wipers 201 and 202 shortly after the busy condition of a line under test has been removed, and that the change over relay 240 which controls the circuits to the vertical magnet VERT. and the rotary magnet ROT. of the test distributor 200 is also used as a guarding relay when a busy condition is removed by applying battery and ground to the test conductors.

In case a direct ground has accidentally been connected to the upper conductor of the line 305 in the immediate vicinity of the switching equipment or in case an extremely low resistance bridge is connected across the line 305 the current flowing through the lower winding of the relay 225 may reach a very high value without effecting the release of the relay 340. The relay 225 can be adjusted to operate when the current flowing through its lower winding reaches a predetermined value, which for example might be two amperes. The relay 225 operates armature 226 first and connects battery through its center winding which in turn further operates the relay opening the armature 227 and energizing the upper winding of the relay 225. The upper winding of the relay 225 is of relatively high resistance and will limit the current flow over the upper test conductor and through wiper 201 to a safe amount, which may be only a few milliamperes.

The conductors C14, C15, C16 and C17 may be conductors connecting two different exchanges and may therefore be relatively long and have considerable resistance. The test distributor 200 and the test connector 300 are a part of the switching equipment in the exchange terminating the line 305, therefore the resistance in the test conductors from operated armatures 251 and 252 to the line 305 is quite low and will have little effect on releasing switching equipment, such as link 330, which has become connected with a line such as the line 305.

It may be noted that when a connection has been set up from the common equipment in Figure 1 through test distributor 200 and test connector 300 to the line 305 when the line 305 is idle that the relay 260 is operated from ground at armature 152 and in series with resistor 256 as previously described. Ground from armature 262, through armature 254, contacts 286, armature 296, wiper 205, contact 25, conductor 35 and wiper 303 is connected to the contact 316 to make the line busy, and extends through armature 311 and the winding of the relay 320 to battery. The relay 320 operates and disconnects the relay 310 and ground from the line at armatures 321 and 322 respectively. Operation of the key 120 operates the relay 130 as previously described thus opening the circuit to the relay 150 which restores and opens the circuit to the relay 260 at armature 152. The relay 260 restores and opens the circuit to the relay 320 at armature 262. The relay 320 restores and connects the relay 310 and ground to the line 305 at armatures 321 and 322 respectively. A circuit may now be traced from battery through the winding of the relay 310, armature 321, contact 314, wiper 301, conductor C31, contact 21, wiper 201, armatures 291, 281, 251 and 211, conductor C14, armature 141, spring 163, conductor C12, spring 117, inductance 104, lower contacts of dial 102, spring 116, conductor C11, spring 164, armature 142, conductor C15, armatures 213, 252, 282 and 292, wiper 202, contact 22, conductor C32, wiper 302, contact 315 and armature 322 to ground. The relay 310 operates and at armature 313 closes a circuit to distributor 370 causing a link such as the link 360 to connect to the line 305 in well known manner. When a link such as the link 330 is connected to the line 305 the relay 330 operates and connects the line relay 340, in multiple with the relay 310. The relay 340 operates closing a circuit to the relay 350 at armature 341. The relay 350 operates, closing a holding circuit for the relay 330 at armature 351. The relay 320 operated from ground through armature 333, wiper 37, contact 325, armature 312 and winding of relay 320 to battery, closes its holding circuit at armature 323 and opens the circuit to the relay 310 at armatures 321 and 322. The relay 340 is now operated in series with the lower contacts of the dial 102 and may be operated under control of the dial 102 to extend the connection through the regular switching equipment. The circuit for direct ground from the upper contacts of the dial 102 to the relay 140 is open at spring 121 to prevent impulses from being transmitted to the relay 220 at this time. The circuit to the dial 102 may be taken through a key, not shown, so that the relay 340 and associated switching equipment may be released after it is operated from the test desk. After the switching equipment is released the key 120 may be restored to release the relay 130. A circuit to the relay 150 is closed at armature 131 and the relay 150 operates closing a circuit at armature 152 to the relay 260. The relay 260 operates and connects ground through armature 262 to contact 316 and the relay 320 to make the line 305 busy. The testing circuit is now connected to the line 305 in the usual manner and testing operations may be performed as desired.

Having described the invention what is considered to be new and is desired to be protected by Letters Patent will be set forth in the following claims.

What is claimed is:

1. In a telephone system, a line, switching equipment releasably connected to said line, test conductors and means for connecting them to said line, a relay operated in response to the connection of said test conductors to said line, a power source, control means including said relay operative in case said test conductors are connected to said line for controlling the connection of said power source to at least one of said test conductors, means responsive to the connection of said power source to said line for releasing said switching equipment from said line, and means responsive to the release of said switching equipment for automatically operating said relay to disconnect said power source subsequent to the release of said switching equipment.

2. In a telephone system, lines, switching equipment and test equipment for connection to said lines, a relay operated in the course of connecting said test equipment to a line, means for releasing said relay, connecting means for connecting switching equipment to a line to which said test equipment is connected, said connecting means being operative responsive to the release of said relay and being effective in case switching equipment is not connected to said line at the time said relay is released, and means for releasing switching equipment connected to a line, said last means being responsive to the release of said relay and being effective in case switching equipment is connected to said last line prior to the connection of said test equipment thereto.

3. In a telephone system, lines, switching equipment for connection to said lines, test equipment for connection to said lines, a key for controlling the connection of switching equipment to a line in case said test equipment is connected thereto, means responsive to the operation of said key for releasing switching equipment from a line in case said switching equipment is connected to said line prior to the connection of said test equipment thereto, and means responsive to the operation of said key for connecting switching equipment to a line in case said test equipment is connected to said line prior to the connection of switching equipment thereto.

4. In a telephone system, lines which may be idle or busy, a test desk and conductors for connecting said test desk to individual ones of said lines, a relay operable under control of said test desk for controlling the idle or busy condition of a line in case said test desk is connected to an idle one of said lines, another relay operated in case said test desk is connected to a busy line, means responsive to the operation of said other relay for extending a busy signal to said test desk, a power source, means operable under control of said test desk for operating said first relay, and means responsive to the operation of said first relay and effective in case said other relay is operated for connecting said power source to a line to which said test desk is connected.

5. In a telephone system, a line, switching equipment releasably connected to said line, test equipment, means for connecting said test equipment to said line, two relays operated in case said test equipment is connected to said line, means jointly controlled by said relays for releasing said switching equipment from said line, and means for preventing the re-connection of said switching equipment to said line, said last means being automatically operated responsive to the release of said switching equipment from said line.

6. In a telephone system, a line, switching equipment connected to said line, testing equipment and means for connecting it to said line, a busy test relay and a control relay operated in case said test equipment is connected to said line, control means including said two relays operable for releasing said switching equipment in case said test equipment is connected to said line, another relay, and means including said three relays for preventing the reconnection of said switching equipment to said line, said last means automatically operated in case said switching equipment is released from said line responsive to the operation of said control means.

7. In a telephone system, a control conductor, two control relays, an impulsing relay, an impulse sender having a normal position, a power source, test conductors, a switch, one of said control relays operative for completing a circuit from said impulsing relay to said impulse sender, said one control relay being operative over said control conductor responsive to the movement of said impulse sender from normal position, the other of said control relays being operative for controlling the connection of said power source to said test conductors, said other control relay being operative over said control conductor responsive to the operation of said switch.

8. In a telephone system, a power source, a line, a busy condition for said line, switching equipment, means for associating said switching equipment with said line, a relay, means for operating said relay in response to the busy condition of said line, means responsive to the operation of said relay for connecting said power source to said line, means for releasing said switching equipment, and means for further operating said relay in response to the release of said switching equipment to disconnect said power source from said line.

9. In a telephone system, a line, means for making said line busy and for indicating the busy condition of the line, test equipment, means for connecting the test equipment to said line, a busy test relay operated responsive to the connection of the test equipment to said line in case it is busy, a power source, means for connecting said power source to a busy line to remove the busy condition therefrom, and contacts on said busy test relay for controlling the connection of said power source to a busy line.

10. In a telephone system, lines, individual control conductors for said lines, a power source, a pole having one potential in said power source, a relay, means for operating said relay to connect said pole to the control conductor of a line to mark said line, switching equipment, means for connecting said equipment to one of said lines, means for releasing said equipment, means responsive to the connection of said equipment to a line to connect said pole to the control conductor of said line, and means for operating said relay to control the connection of said power source to a line to release switching equipment connected thereto, said last mentioned means being effective in case said pole is connected to the control conductor of a line responsive to the connection of switching equipment thereto.

FRANK KESSLER.

REFERENCES CITED

The following references are of record in the file of this patent:

UNITED STATES PATENTS

| Number | Name | Date |
|---|---|---|
| 2,301,837 | Wiley et al. | Nov. 10, 1942 |
| 2,371,989 | Griffins et al. | Mar. 20, 1945 |
| 2,479,276 | Taylor | Aug. 16, 1949 |